# 2,971,000

PROCESS FOR THE PRODUCTION OF PYRIDYL-GLYCOLS

Wilhelm Mathes and Walter Sauermilch, Ludwigshafen (Rhine), Germany, assignors to Dr. F. Raschig G.m.b.H. Chemische Fabrik, Ludwigshafen (Rhine), Germany No Drawing. Filed May 23, 1958, Ser. No. 737,203

Claims priority, application Germany May 31, 1957

2 Claims. (Cl. 260—288)

The present invention relates to an improved process for the production of pyridyl-glycols.

It is known that pyridyl-glycols can be produced by reduction of pyridoins or pyridine aldehydes with nascent or catalytically activated hydrogen. Such a process always results in symmetrically substituted pyridyl-glycols and no "mixed" or "unsymmetrical" pyridyl-glycols could be produced thereby.

According to the invention it was unexpectedly found that "mixed" as well as symmetrical pyridyl-glycols can be obtained in a simple manner with satisfactory yields by decarboxylating pyridyl glycolic acids in the presence of aldehydes. The pyridyl-glycols are thereby produced according to the following equation:

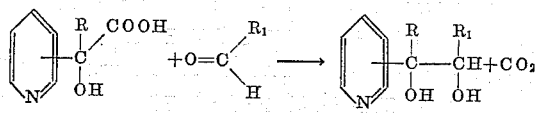

wherein $R=H$ and $CH_3$ and $R_1=H$, an aromatic, heterocyclic or aliphatic radical.

The decarboxylation reaction can be carried out simply by heating a mixture of the reactants, for example, at temperatures between 50° C. and 100° C., preferably between 75° C. and 85° C., until evolution of $CO_2$ ceases. As the decarboxylation reaction involves evolution of a gas, namely, $CO_2$, it can be promoted by use of subatmospheric pressures.

Preferably stoichiometric proportions of the reactants are employed.

The following examples will serve to illustrate several embodiments of the invention:

Example 1

1.53 g. (1/100 mol) of α-pyridyl-glycolic acid was mixed with 1.07 g. (1/100 mol) of pyridine aldehyde-(2) and the mixture was heated on a steam bath until the evolution of $CO_2$ ceased. The resulting tough dark mass crystallized upon cooling off and grinding. The crude reaction product was dissolved in boiling water and the solution treated with active carbon and filtered hot. Upon cooling, bispyridyl-(2)-glycol of a melting point of 156° C. crystallized out in the form of colorless crystals.

Example 2

1.52 g. (1/100 mol) of α-pyridyl glycolic acid was mixed with 1 cc. of 30% formaldehyde. The mixture was heated on a steam bath until the evolution of $CO_2$ ceased. After cooling the reaction product with ice water the mono-pyridyl-(2)-glycol crystallized out in colorless crystals. After recrystallization from di-isopropyl-ether, it had a melting point of 98° C.

Example 3

1.53 g. (1/100 mol) of α-pyridyl-glycolic acid was mixed with 1.48 g. (1/100 mol) of water free chloral and heated on a steam bath with stirring until evolution of $CO_2$ subsided. The dark brown reaction mass was boiled up several times, each time with 10 cc. of water. The resulting hot solution was decolorized with active carbon and filtered. Upon cooling, about 1.8 g. of colorless crystals of pyridyl-(2)-trichloromethyl-glycol having a melting point of 120° C. were obtained.

Example 4

1.53 g. (1/100 mol) of α-pyridyl-glycolic acid was heated together with 1.48 g. (1/100 mol) of benzaldehyde upon a steam bath until evolution of $CO_2$ subsided. The reaction product was dissolved in hot ethanol and the solution clarified with charcoal. Upon addition of water, about 1.5 g. of α-pyridyl-phenyl glycol precipitated as colorless crystals having a melting point of 143° C.

Example 5

6.7 g. (4/100 mol) of pyridyl-2-hydroxy propionic acid were mixed with 6.3 g. (4/100 mol) of quinoline-aldehyde-(2). The mixture was heated with stirring upon a steam bath (about 15 minutes) until evolution of $CO_2$ ceased. After the product had cooled and stood overnight, about 25 cc. of methanol were added to the cloudy pasty reaction product and the mixture thoroughly stirred, whereupon a white precipitate of crystalline flocks separated out. The precipitate was filtered off on a suction filter and washed with methanol. 3 g. of the crude product of 1-(pyridyl-2)-1-methyl-2-(quinolyl-2)-ethylene glycol-1.2 were obtained which were recrystallized from pyridine by precipitation with di-isopropyl ether. The recrystallized product had a melting point of 209–210° C. with decomposition.

Example 6

The procedure of Example 5 was repeated with the exception that quinoline aldehyde 4 was employed instead of quinoline aldehyde-(2). 3.2 g. of 1-(pyridyl-2)-1-methyl-2-(quinolyl-4) ethylene glycol 1.2 were obtained as colorless crystals with a melting point of 186–187° C.

Example 7

5 g. (3/100 mol) of pyridyl-2-hydroxy propionic acid and 3.2 g. (3/100 mol) of freshly distilled benzaldehyde were subjected to thermal decarboxylation as in Example 5. The reaction product was acidified with HCl and heated on a water bath until it had concentrated to a syrupy consistency. The syrup was placed in a desiccator over calcium chloride and after standing therein the hydrochloride of the glycol crystallized out. The crystals were purified by dissolving in warm 1:1 acetone-ethanol mixture and filtering. Di-isopropyl ether was added to the filtered solution whereupon the hydrochloride of the glycol separated out in oily form. After several hours standing the oil solidified to crystals. 2.9 g. of 1-(pyridyl-2)-1-methyl-2-(phenyl)-ethylene glycol-1.2 of a melting point of 119–121° C. were obtained.

Example 8

3.3 g. (2/100 mol) of pyridyl-4-hydroxy propionic acid and 2.2 g. (2/100 mol) of benzaldehyde were decarboxylated as in Example 5. The reaction product was triturated with di-isopropyl ether and the crystalline glycol which flocked out was suction filtered. 4 g. of moist suction filtered crude product, 1-(pyridyl-4)-1-methyl-2-phenyl-ethylene glycol 1.2 of a melting point of 119–132° C. were obtained. It was recrystallized from water and the recrystallized product had a melting point of 149.5–151° C. Because of its hygroscopic characteristics it was converted to its hydrochloride, the melting point of which was 179–181° C.

Example 9

Analogously 3.3 g. (2/100 mol) of pyridyl-4-hydroxy propionic acid were heated together with 2.94 g. (2/100 mol) of water free chloral until evolution of $CO_2$ ceased. The reaction product was triturated with di-isopropyl ether and the precipitated 1-(pyridyl-4)-1-methyl-2-(trichloromethyl)-ethylene glycol-1.2 filtered off on a suction filter. 2.1 g. of the product in the form of colorless crystals having a melting point of 189–190.5° C. were obtained. The product was converted to its hydrochloride, the melting point of which was 206–207° C.

Example 10

Analogously 1.67 g. (1/100 mol) pyridyl-2-hydroxy propionic acid and 1.07 g. (1/100 mol) of pyridine aldehyde-4 were heated on a steam bath to effect decarboxylation. After cooling the reaction product solidified to a solid crystalline cake. 2.1 g. of the crude 1-(pyridyl-2)-1-methyl-2-(pyridyl-4)-ethylene glycol-1.2 were obtained as the crude product. The crude product was recrystallized from water to produce colorless crystals of a melting point of 93–95° C. The glycol crystallized with at least 1 mol of water of crystallization.

Example 11

Analogous to Example 10 about 2 g. of 1-(pyridyl-4)-1-methyl-2-(pyridyl-3)-ethylene glycol 1.2 were obtained in the form of colorless crystals employing pyridine aldehyde-3 instead of pyridine aldehyde-4 and pyridyl-4-hydroxy propionic acid instead of pyridyl-2-hydroxy propionic acid. The product had a melting point of 188.5° C.

The pyridyl glycol compounds produced according to the invention are useful starting materials for many varied synthesis. For example: They can be used as starting materials in the known Criegee-cleavage to produce pyridine aldehydes or respectively acetyl pyridines (see W. Mathes and W. Sauermilch, Chem. Ber. 84, 457 (1951), and Chem. Ber. 85, 1009 (1952)). Also, according to Daniloff and Danilova, Chem. Ber. 59, 1041 (1926), one can obtain the correspondingly substituted acetaldehydes from substituted glycols.

We claim:
1. A process for the production of a pyridyl-glycol of the following formula:

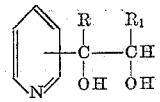

wherein R is selected from the group consisting of H and methyl radicals and $R_1$ is selected from the group consisting of H, phenyl, pyridyl, quinolyl and alkyl which comprises heating a pyridyl glycolic acid of the formula

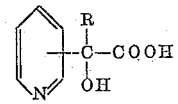

wherein R has the same significance as above in admixture with an aldehyde of the formula

wherein $R_1$ has the same significance as above to a temperature between 50° C. and 100° C. to effect decarboxylation of said pyridyl glycolic acid in the presence of said aldehyde.

2. The process of claim 1 in which said decarboxylation is effected at temperatures between 75° C. and 85° C.

References Cited in the file of this patent

UNITED STATES PATENTS 2,743,277   Cislak _____ Apr. 24, 1956

OTHER REFERENCES

Noller: Chemistry of Organic Compounds, W. B. Saunders Co., Philadelphia (1951), pp. 198–199.

Buehler et al.: J. Org. Chem., vol. 20 (1955), pp. 1350–1355.

Edwards et al.: J.A.C.S., vol. 74 (1952), pp. 977–978.

Mathes et al.: Berichte der Deut. Chem. Gesel., vol. 87 (1954), p. 1870.

Mathes et al.: Berichte der Deut. Chem. Gesel., vol. 89 (1956), pp. 1518–1521.